US009854455B2

(12) United States Patent
Lee et al.

(10) Patent No.: US 9,854,455 B2
(45) Date of Patent: Dec. 26, 2017

(54) APPARATUS AND METHOD FOR PROVIDING COOPERATIVE COMMUNICATION SERVICE BETWEEN MACRO BASE STATION AND SMALL CELL BASE STATION IN MOBILE COMMUNICATION SYSTEM

(71) Applicant: Samsung Electronics Co. Ltd., Suwon-si, Gyeonggi-do (KR)

(72) Inventors: Ok-Seon Lee, Suwon-si (KR); Rakesh Taori, Suwon-si (KR); Jung-Shin Park, Seoul (KR); Young-Bin Chang, Anyang-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 14/021,490

(22) Filed: Sep. 9, 2013

(65) Prior Publication Data
US 2014/0071943 A1 Mar. 13, 2014

(30) Foreign Application Priority Data

Sep. 10, 2012 (KR) ........................ 10-2012-0099742

(51) Int. Cl.
*H04W 16/32* (2009.01)
*H04W 36/38* (2009.01)
(Continued)

(52) U.S. Cl.
CPC ....... *H04W 16/32* (2013.01); *H04W 36/0055* (2013.01); *H04W 36/38* (2013.01); *H04W 36/04* (2013.01)

(58) Field of Classification Search
None
See application file for complete search history.

(56) References Cited

U.S. PATENT DOCUMENTS 6,233,453 B1 5/2001 Roberts
6,301,478 B1 * 10/2001 Wallstedt et al. ............ 455/436
(Continued)

FOREIGN PATENT DOCUMENTS

EP 0 933 960 A1 11/1998
EP 2 228 957 A1 3/2009
(Continued)

OTHER PUBLICATIONS

Heterogeneous Networks, Ericsson White Paper 284 23-3165 UEN. Feb. 2012.
(Continued)

*Primary Examiner* — Mounir Moutaouakil
(74) *Attorney, Agent, or Firm* — Jefferson IP Law, LLP

(57) ABSTRACT

A method for providing a cooperative communication service by a macro Base Station (BS) in a mobile communication system is provided. The method includes generating at least one small cell BS group by grouping small cell BSs if there are small cell BSs of which a number is equal to or larger than a threshold small cell BS number within a service coverage of the macro BS, establishing a cooperative interface with a representative small cell BS among small cell BSs included in the at least one small cell BS group, and providing a cooperative communication service with the at least one small cell BS group using the cooperative interface.

22 Claims, 12 Drawing Sheets

(51) Int. Cl.
*H04W 36/00* (2009.01)
*H04W 36/04* (2009.01)

(56) References Cited

U.S. PATENT DOCUMENTS

| | | | |
|---|---|---|---|
| 8,483,723 B2* | 7/2013 | Park et al. | 455/456.6 |
| 8,588,790 B2* | 11/2013 | Cho et al. | 455/444 |
| 8,934,910 B2* | 1/2015 | Lee et al. | 455/444 |
| 2005/0148368 A1* | 7/2005 | Scheinert | H04W 24/02 455/561 |
| 2009/0219888 A1* | 9/2009 | Chen | H04W 64/00 370/331 |
| 2009/0247170 A1* | 10/2009 | Balasubramanian et al. | 455/445 |
| 2009/0323633 A1* | 12/2009 | Burgess et al. | 370/331 |
| 2010/0008295 A1* | 1/2010 | Ji et al. | 370/328 |
| 2010/0113036 A1* | 5/2010 | Cho et al. | 455/444 |
| 2010/0234053 A1 | 9/2010 | Zangi et al. | |
| 2011/0059744 A1* | 3/2011 | Won et al. | 455/450 |
| 2011/0151859 A1* | 6/2011 | Lee et al. | 455/422.1 |
| 2012/0015655 A1* | 1/2012 | Lee | H04W 8/02 455/435.1 |
| 2012/0129527 A1* | 5/2012 | Takeuchi et al. | 455/436 |
| 2012/0190374 A1* | 7/2012 | Jo et al. | 455/450 |
| 2012/0225680 A1* | 9/2012 | Suh | 455/501 |
| 2012/0264431 A1* | 10/2012 | Lee et al. | 455/436 |
| 2012/0270553 A1* | 10/2012 | Ha | 455/438 |
| 2012/0315911 A1* | 12/2012 | Han | 455/437 |
| 2013/0072196 A1* | 3/2013 | Jung et al. | 455/437 |
| 2013/0172000 A1* | 7/2013 | Van Phan | H04W 16/26 455/450 |
| 2013/0190024 A1* | 7/2013 | Hayase et al. | 455/501 |
| 2014/0036737 A1* | 2/2014 | Ekpenyong et al. | 370/280 |
| 2014/0256332 A1* | 9/2014 | Shu et al. | 455/447 |
| 2014/0301378 A1* | 10/2014 | Xu | H04L 41/12 370/338 |

FOREIGN PATENT DOCUMENTS

| | | |
|---|---|---|
| EP | 2 375 807 A1 | 10/2011 |
| KR | 10-2010-0000794 A | 1/2010 |
| KR | 10-2011-0051096 A | 5/2011 |
| WO | 2012-075397 A1 | 6/2012 |

OTHER PUBLICATIONS

XP031659739—"Multi-hop based network synchronization scheme for femtocell systems," Sep. 13, 2009, Daejeon, Republic of Korea.

XP011334686—"A 25 Gb/s(/km2)urban wireless network beyond IMT-advanced," Feb. 1, 2011, Hong Kong, Republic of China.

* cited by examiner

APPARATUS AND METHOD FOR PROVIDING COOPERATIVE COMMUNICATION SERVICE BETWEEN MACRO BASE STATION AND SMALL CELL BASE STATION IN MOBILE COMMUNICATION SYSTEM

CROSS-REFERENCE TO RELATED APPLICATION(S)

This application claims the benefit under 35 U.S.C. §119(a) of a Korean patent application filed on Sep. 10, 2012 in the Korean Intellectual Property Office and assigned Serial No. 10-2012-0099742, the entire disclosure of which is hereby incorporated by reference.

TECHNICAL FIELD

The present disclosure relates to an apparatus and method for providing a cooperative communication system service between a macro Base Station (BS) and a small cell BS in a mobile communication system. More particularly, the present disclosure relates to an apparatus and method for providing a cooperative communication system service between a macro BS and a small cell BS if a small cell BS is located within a service coverage of a macro BS in a mobile communication system.

BACKGROUND

In a mobile communication system, various schemes such as a scheme of enhancing frequency efficiency for satisfying radio data traffic which rapidly increases and a scheme for using a high frequency band has been used. Further, in a mobile communication system, a small cell Base Station (BS) which has a relative small service coverage such as a pico-cell, a femto cell, a Local Access Network (LAN), etc. is additionally deployed for increasing total capability, and various schemes for maximizing usage of small cell BSs by distributing traffic of macro BSs to the small cell BSs has been used.

The small cell BS may increase the total capability of the mobile communication system with relative row cost compared with a macro BS. So, there is a need for providing a cooperative service by a process for transmitting/receiving information between the macro BS and the small cell BS for effectively using the small cell BS, and there is a need for effectively managing small cell BSs according to an increase of the number of the small cell BSs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to propose an apparatus and method for providing a cooperative communication system service between a macro Base Station (BS) and a small cell BS in a mobile communication system.

Another aspect of the present disclosure is to propose an apparatus and method for providing a cooperative communication system service between a macro BS and a small cell BS if a small cell BS is located within a service coverage of a macro BS in a mobile communication system.

Another aspect of the present disclosure is to propose an apparatus and method for providing a cooperative communication system service between a macro BS and a small cell BS in a mobile communication system thereby effectively distributing data traffic of a macro BS.

Another aspect of the present disclosure is to propose an apparatus and method for providing a cooperative communication system service between a macro BS and a small cell BS in a mobile communication system thereby guaranteeing a mobility of an MS.

Another aspect of the present disclosure is to propose an apparatus and method for providing a cooperative communication system service between a macro BS and a small cell BS in a mobile communication system thereby increasing radio resource efficiency.

In accordance with an aspect of the present disclosure, a method for providing a cooperative communication service by a macro BS in a mobile communication system is provided. The method includes generating at least one small cell BS group by grouping small cell BSs, if there are small cell BSs of which a number is equal to or larger than a threshold within a service coverage of the macro BS, establishing a cooperative interface with a representative small cell BS among small cell BSs included in the at least one small cell BS group, and providing a cooperative communication service with the at least one small cell BS group using the cooperative interface.

In accordance with another aspect of the present disclosure, a method for providing a cooperative communication service by a representative small cell BS in a mobile communication system is provided. The method includes establishing a cooperative interface with a macro BS, and providing a cooperative communication service with the macro BS using the cooperative interface, wherein the representative small cell BS is a representative of a small cell BS group including at least two small cell BSs.

In accordance with another aspect of the present disclosure, a method for providing a cooperative communication service by a member small cell BS in a mobile communication system is provided. The method includes receiving a group join request message from a representative small cell BS of a small cell BS group in which the member small cell BS is included, and transmitting a group join response message as a response message to the group join request message to the representative small cell BS, wherein the group join request message is transmitted if the representative small cell BS receives a group information message from a macro BS.

In accordance with another aspect of the present disclosure, a method for receiving a cooperative communication service by a Mobile Station (MS) in a mobile communication system is provided. The method includes receiving a handover command message which commands the MS to perform a handover operation to a target small cell BS from a macro BS, wherein, if a target small cell BS is included in a small cell BS group, when the macro BS transmits a handover request message to a representative small cell BS of the small cell BS group, receives a handover response message as a response message to the handover request message from the representative small cell BS, and detects that the handover response message indicates that the handover of the MS is allowed, the handover command message is transmitted from the macro BS to the MS.

In accordance with another aspect of the present disclosure, a macro BS in a mobile communication system is provided. The macro BS includes controller configured to generate at least one small cell BS group by grouping small cell BSs if there are small cell BSs of which a number is equal to or larger than a threshold small cell BS number within a service coverage of the macro BS, to establish a cooperative interface with a representative small cell BS among small cell BSs included in the at least one small cell BS group, and to provide a cooperative communication service with the at least one small cell BS group using the cooperative interface.

In accordance with another aspect of the present disclosure, a representative small cell BS in a mobile communication system is provided. The representative small cell BS includes a controller configured to establish a cooperative interface with a macro BS, and to provide a cooperative communication service with the macro BS using the cooperative interface, wherein the representative small cell BS is a representative of a small cell BS group including at least two small cell BSs.

In accordance with another aspect of the present disclosure, a member small cell BS in a mobile communication system is provided. The member small cell BS includes a receiver configured to receive a group join request message from a representative small cell BS of a small cell BS group in which the member small cell BS is included, and a transmitter configured to transmit a group join response message as a response message to the group join request message to the representative small cell BS, wherein the group join request message is transmitted if the representative small cell BS receives a group information message from a macro BS.

In accordance with another aspect of the present disclosure, a MS in a mobile communication system is provided. The MS includes a receiver configured to receive a handover command message which commands the MS to perform a handover operation to a target small cell BS from a macro BS, wherein, if a target small cell BS is included in a small cell BS group, when the macro BS transmits a handover request message to a representative small cell BS of the small cell BS group, receives a handover response message as a response message to the handover request message from the representative small cell BS, and detects that the handover response message indicates that the handover of the MS is allowed, the handover command message is transmitted from the macro BS to the MS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
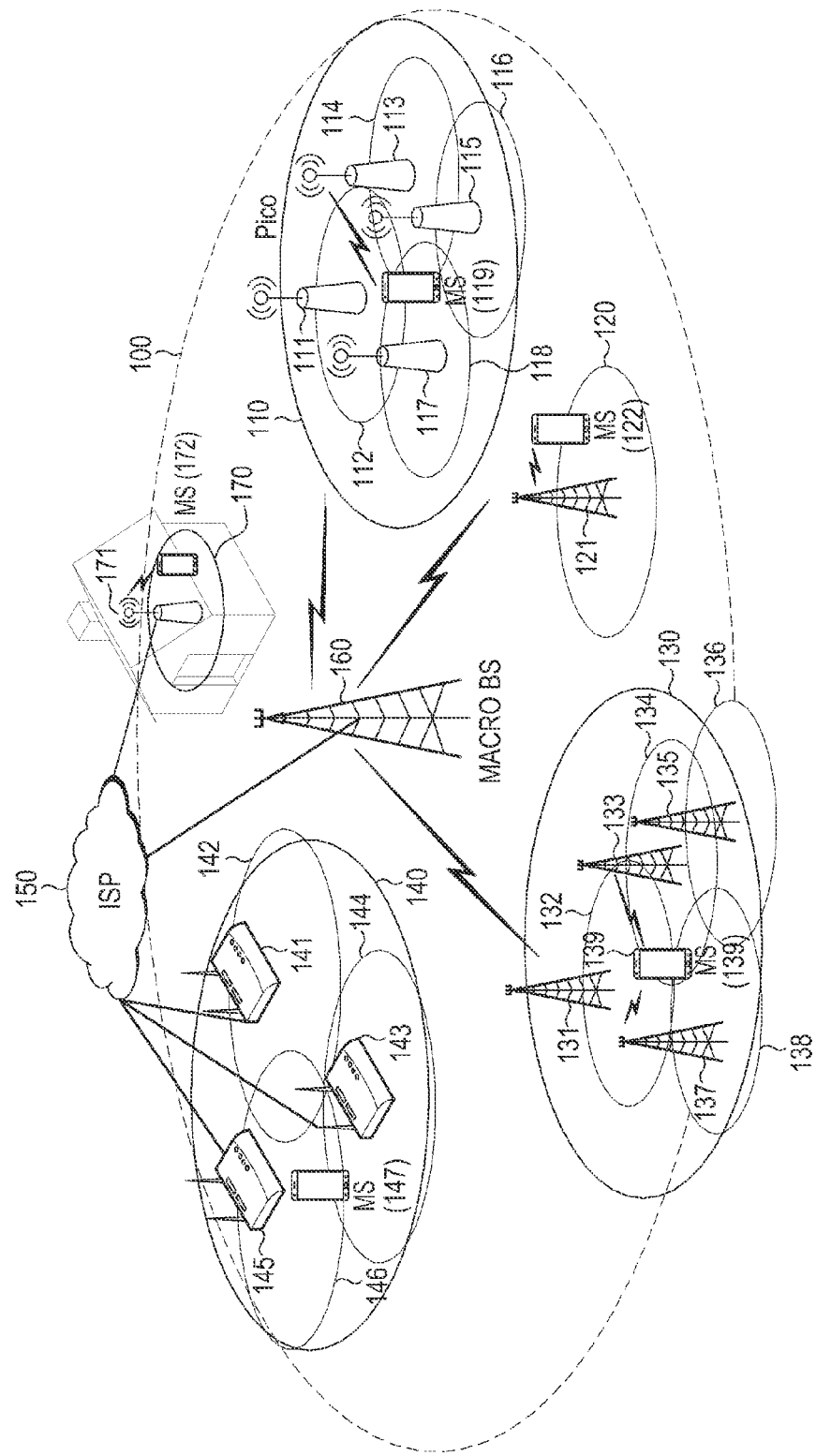
FIG. 1 illustrates a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An aspect of the present disclosure is to propose an apparatus and method for providing a cooperative communication system service between a macro Base Station (BS) and a small cell BS in a mobile communication system.

Another aspect of the present disclosure is to propose an apparatus and method for providing a cooperative communication system service between a macro BS and a small cell BS if a small cell BS is located within a service coverage of a macro BS in a mobile communication system.

Another aspect of the present disclosure is to propose an apparatus and method for providing a cooperative communication system service between a macro BS and a small cell BS in a mobile communication system thereby effectively distributing data traffic of a macro BS.

Another aspect of the present disclosure is to propose an apparatus and method for providing a cooperative communication system service between a macro BS and a small cell BS in a mobile communication system thereby guaranteeing a mobility of a Mobile Station (MS).

Another aspect of the present disclosure is to propose an apparatus and method for providing a cooperative communication system service between a macro BS and a small cell BS in a mobile communication system thereby increasing radio resource efficiency.

An apparatus and method proposed in the present disclosure may be applied to various mobile communication systems such as a Long-Term Evolution (LTE) mobile communication system, a Long-Term Evolution-Advanced (LTE-A) mobile communication system, an Institute of Electrical and Electronics Engineers (IEEE) 802.16m communication system, and a cloud cell communication system.

FIG. 1 illustrates a mobile communication system according to an embodiment of the present disclosure.

Referring to FIG. 1, the mobile communication system includes an Internet Service Provider (ISP) 150, a macro BS 160, a plurality of small cell BSs 111, 113, 115, 117, 121, 131, 133, 135, 137, 141, 143, 145, and 171, and MSs 119, 122, 139, 147, and 172.

A service coverage of the macro BS 160 includes service coverage 112, 114, 116, 118, 120, 132, 134, 136, 138, 142, 144, 146, 170 of each of the small cell BSs 111, 113, 115, 117, 121, 131, 133, 135, 137, 141, 143, 145, and 171, respectively. Each service coverage 112, 114, 116, 118, 120, 132, 134, 136, 138, 142, 144, 146, and 170 is a pico cell, each service coverage 142, 144, and 146 is a Wireless-Fidelity (Wi-Fi) cell, and the service coverage 170 is a femto cell.

Each of the small cell BSs 111, 113, 115, 117, 121, 131, 133, 135, 137, 141, 143, 145, and 171 may provide a communication service to a Mobile Station (MS) by establishing a radio interface with the macro BS 160. On the other hand, each of the small cell BSs 111, 113, 115, 117, 121, 131, 133, 135, 137, 141, 143, 145, and 171 may provide the communication service to the MS by generating small cell BS groups with one another and performing a cooperative communication with the macro BS 160.

Referring to FIG. 1, it is noted that there are three small cell BS groups 110, 130, and 140. The small cell BS groups 110, 130, and 140 are generated based on a small cell BS group generation scheme as described below.

Referring to FIG. 1, the mobile communication system includes one macro BS 160. However, it will be understood by those of ordinary skill in the art that there is no limitation for the number of macro BSs.

Figure 2:
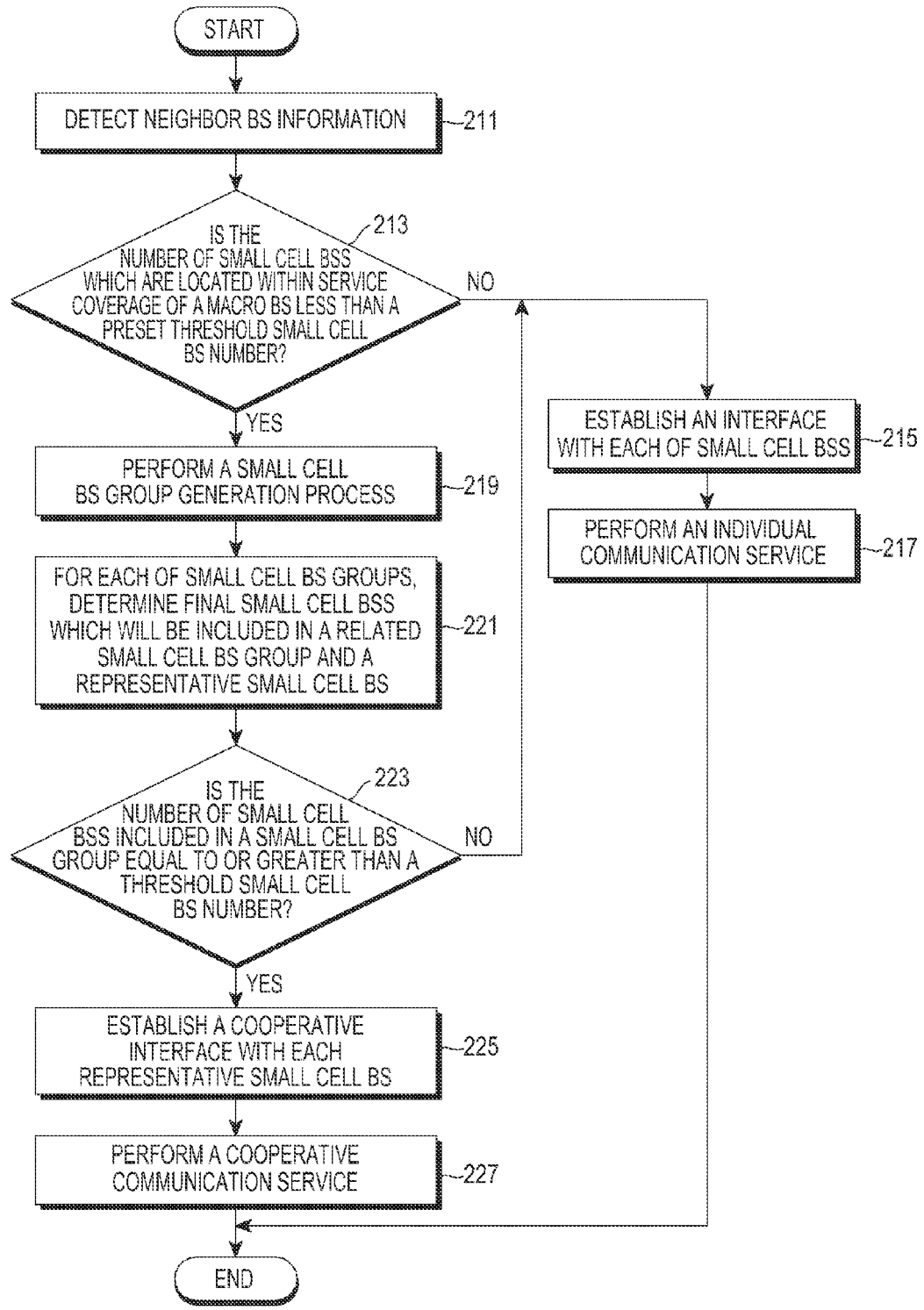
FIG. 2 illustrates a flowchart for setting up an interface with a small cell Base Station (BS) in a macro BS according to an embodiment of the present disclosure.

FIG. 2 illustrates a flowchart for setting up an interface with a small cell BS in a macro BS in a mobile communication system according to an embodiment of the present disclosure.

A process for initially setting up an interface between a macro BS and a small cell BS in FIG. 2 is performed if the macro BS does not set up an interface with any small cell BS in the mobile communication system such as a case that the macro BS is newly deployed, and the macro BS transits from a power off state to a power on state.

Referring to FIG. 2, the macro BS detects neighbor BS information in operation 211. The macro BS may detect the neighbor BS information using various schemes, and a detailed description will be followed.

The first scheme is a scheme in which the macro BS detects the neighbor BS information by receiving neighbor BS information. That is, in the first scheme, a network connected to the macro BS notifies the macro BS of the neighbor BS information by detecting the neighbor BS information. For example, the neighbor BS information may include BS IDentifier (ID) information, location information, and supportable radio communication protocol information of each of the neighbor BSs.

For a small cell BS, a macro BS which has a service coverage that overlaps with the service coverage of a small cell BS may be included in neighbor BSs of the small cell BS, and there may be two or more than two macro BSs which have a service coverage overlapped with a service coverage of the small cell BS. The small cell BS generates neighbor BS information by including BS information for all macro BSs which have a service coverage overlapped with the service coverage of the small cell BS.

The second scheme is a scheme in which the macro BS detects the neighbor BS information by receiving a measurement result report message transmitted from an MS.

The measurement result report message includes neighbor BS information that is detected by the MS and a measurement result information indicating a measurement operation result for a reference signal transmitted from each of the neighbor BSs. For example, the reference signal may be a pilot signal. For example, the measurement result may be received signal strength such as a Signal to Interference and Noise Ratio (SINR), a Signal to Noise Ratio (SNR), a Received Signal Strength Indicator (RSSI), a Channel Quality Indicator (CQI), etc. In this case, the macro BS transmits a measurement information message to the MS which includes information necessary for inducing transmitting a measurement result report message.

Further, each small cell BS periodically broadcasts its own BS information. After detecting related BS information, the MS includes the detected BS information as neighbor BS information into the measurement result report message, and transmits the measurement result report message to the macro BS.

The macro BS determines whether the number of small cell BSs are located within a service coverage of the macro BS is less than a preset threshold small cell BS number using the detected neighbor BS information in operation 213. If the communication service between the macro BS and the small cell BS is a cooperative communication service that may enhance total system performance as compared with a case that the communication service between the macro BS and the small cell BS is an individual communication service, the threshold small cell BS number is determined as the number of small cell BSs that join the cooperative communication service. There may be various parameters used for determining the number of the small cell BSs. The threshold small cell BS number may be a value that is generated by dividing throughput of an interface between the macro BS and the small cell BS by average throughput, or minimum throughput which the interface between the macro BS and the small cell BS requires.

If the number of small cell BSs located within the service coverage of the macro BS is less than the preset threshold small cell BS number, the macro BS establishes an interface with each of the small cell BSs in operation 215. The process for establishing the interface with each of the small cell BSs will be described below. The macro BS performs an individual communication service between the macro BS and each of the small cell BSs using the established interface in operation 217.

Referring back to operation 213, if the number of small cell BSs located within the service coverage of the macro BS is equal to or greater than the threshold small cell BS number (i.e., the number of small cell BSs which are located within the service coverage of the macro BS is not less than the threshold small cell BS number), the macro BS performs a small cell BS group generation process to generate small cell BS groups in operation 219. The small cell BS group is generated to include small cell BSs which are separated by a distance less than a preset threshold inter-small cell distance and may communicate with one another. According to performing a small cell BS group generation process, one small cell BS may establish an individual interface with each macro BS or may be included in a small cell BS group located within a service coverage of each macro BS if the one small cell BS is located in a region in which a service coverage of a plurality of macro BSs overlap. If a small cell BS is located within a service coverage of one macro BS, the small cell BS may establish an individual interface with a related macro BS, or may be included in one small cell BS group which is located within a service coverage of the related macro BS.

The process for generating the small cell BS group will be described below.

The macro BS determines final small cell BSs included in a related small cell BS group for each of the generated small cell BS groups and a representative small cell BS of a small cell BS group is determined in operation 221.

A detailed description of operation 221 will be described below.

Firstly, a detailed description of a process for determining a representative small cell BS will be described below.

The macro BS may determine a small cell BS which is nearest from the macro BS among small cell BSs included in a related small cell BS group as a representative small cell BS. A scheme for measuring a distance between the macro BS and each of the small cell BSs may be implemented as various forms, and a detailed description will be omitted.

On the other hand, the macro BS may determine a small cell BS which has the lowest load among the small cell BSs included in the related small cell BS group as the representative small cell BS. A scheme for measuring load of each of the small cell BSs may be implemented as various forms, and a detailed description will be omitted.

Secondly, a detailed description of a process for determining final small cell BSs which will be included in a related small cell BS group will be described below.

If a small cell BS which is simultaneously included in more than one small cell BS group, the macro BS includes the small cell BS into a small cell BS group nearest to the small cell BS. So, in a service coverage of the macro BS, small cell BSs located within the service coverage of the macro BS are included in one small cell BS group and perform a cooperative communication service between a macro BS and a small cell BS, or establish a direct interface with the macro BS and perform a cooperative communication service between a macro BS and a small cell BS. That is, the small cell BSs located within the service coverage of the macro BS are included in one small cell BS group even though the small cell BSs may be included in a plurality of small cell BS groups.

As described above, after determining the final small cell BSs which will be included in the related small cell BS group, the macro BS determines whether the number of the small cell BSs included in the related small cell BS group is equal to or greater than the threshold small cell BS number in operation 223. If the number of the small cell BSs in the small cell BS group is not equal to or greater than the threshold small cell BS number (i.e., the number of the small cell BSs included in the related small cell BS group is less than the threshold small cell BS number), the macro BS individually establishes an interface with each of the small cell BSs included in the related small cell BS group in operation 215 and performs an individual communication service with each of the small cell BSs using the established interface in operation 217.

Referring back to operation 223, if the number of the small cell BSs included in the related small cell BS group is equal to or greater than the threshold small cell BS number, the macro BS establishes a cooperative interface with a representative small cell BS of each of the small cell BS groups in operation 225. A process for establishing the cooperative interface with the representative small cell BS of each of the small cell BS groups will be described below. The macro BS performs a cooperative communication service between a macro BS and a representative small cell BS using the cooperative interface which the macro BS has established with each of the representative small cell BSs in operation 227.

Figure 3:
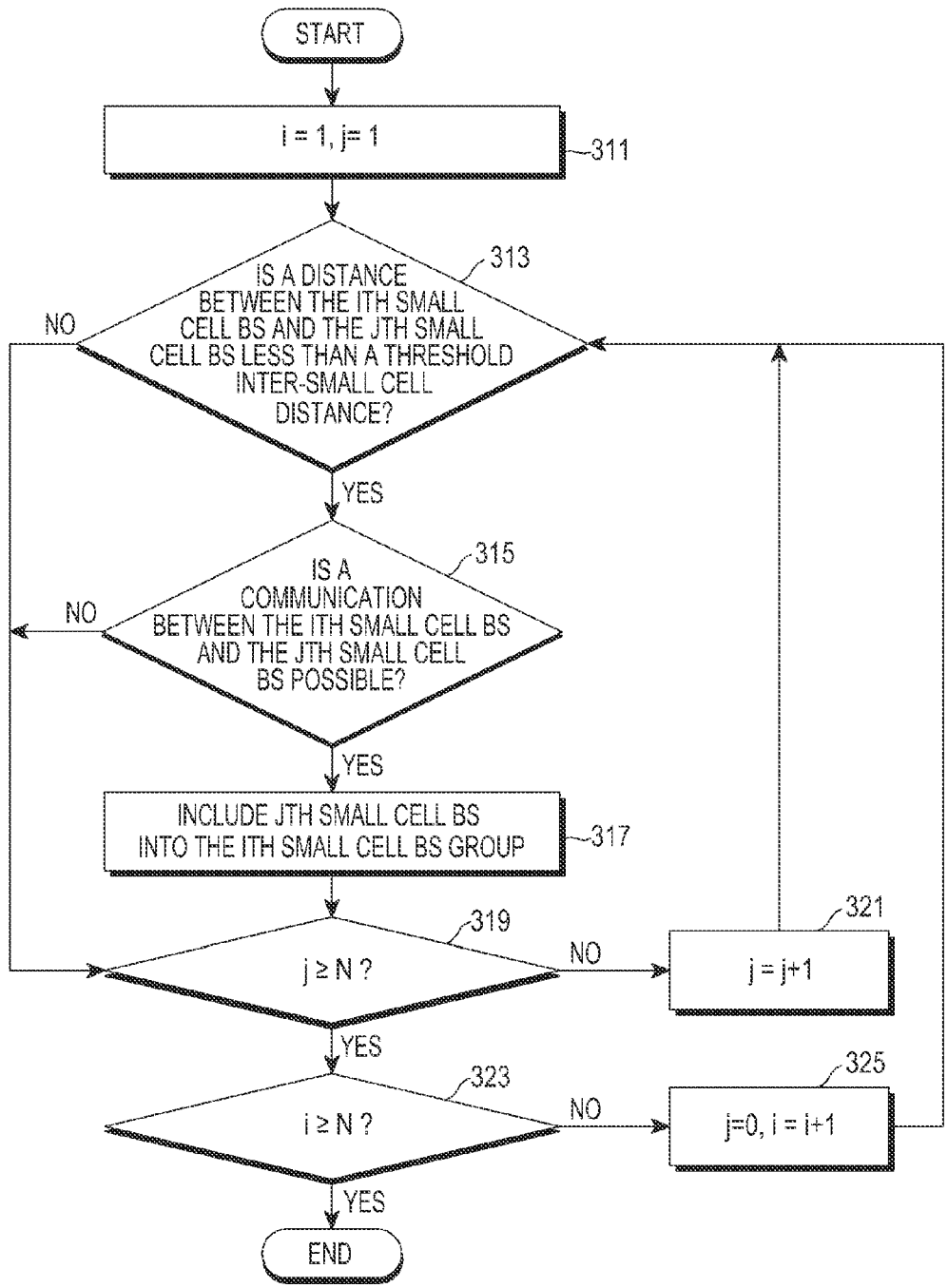
FIG. 3 illustrates a flowchart for performing a small cell BS group generating process in operation 219 in FIG. 2 according to an embodiment of the present disclosure.

FIG. 3 schematically illustrates a flowchart for performing a small cell BS group generating process in operation 219 in FIG. 2 according to an embodiment of the present disclosure.

First, a small cell BS group generation process denotes including small cell BSs which have distances less than a preset threshold inter-small cell distance one another and may communicate one another. According to performing the small cell BS group generation process, a small cell BS may be included in more than one small cell BS group.

Referring to FIG. 3, a macro BS sets an initial value of each of a variable and a variable j which will be used for generating a small cell group to a preset value, e.g., "1" in operation 311. The variable j denotes an index of a small cell BS, and the variable i denotes an index of a small cell BS and an index of a small cell BS group. The macro BS determines whether a distance between the ith small cell BS and the jth small cell BS is less than the threshold inter-small cell distance in operation 313. The distance between the ith small cell BS and the jth small cell BS may be measured with various schemes.

If the distance between the ith small cell BS and the jth small cell BS is less than the threshold inter-small cell distance, the macro BS determines whether a communication between the ith small cell BS and the jth small cell BS is possible in operation 315. If the communication between the ith small cell BS and the jth small cell BS is possible, the macro BS includes the ith small cell BS into the ith small cell BS group in operation 317 and proceeds to operation 319.

Referring back to operation 313, if the distance between the ith small cell BS and the jth small cell BS is not less than the threshold inter-small cell distance (i.e., the distance between the ith small cell BS and the jth small cell BS is equal to or greater than the threshold inter-small cell distance), the macro BS proceeds to operation 319.

Referring back to operation 315, if the communication between the ith small cell BS and the jth small cell BS is impossible, the macro BS proceeds to operation 319.

The macro BS determines whether a value of the variable j is equal to or greater than a total number of small cell BSs N in operation 319. Here, the small cell BSs are detected using neighbor BS information. If the value of the variable j is not equal to or greater than the total number of small cell BSs N (i.e., the value of the variable j is less than the total number of small cell BSs N), the macro BS increases the value of the variable j by a value, e.g., "1" in operation 321 and returns to operation 313.

If the value of the variable j is equal to or greater than the total number of small cell BSs N, the macro BS determines whether a value of the variable i is equal to or greater than the total number of small cell BSs N in operation 323. If the value of the variable i is not equal to or greater than the total number of small cell BSs N (i.e., the value of the variable i is less than the total number of small cell BSs N), the macro BS increases the value of the variable i by a value, e.g., "1" in operation 325 and returns to operation 313. If the value of the variable i is equal to or greater than the total number of small cell BSs N in operation 323, the small cell BS group generation process ends.

Figure 4:
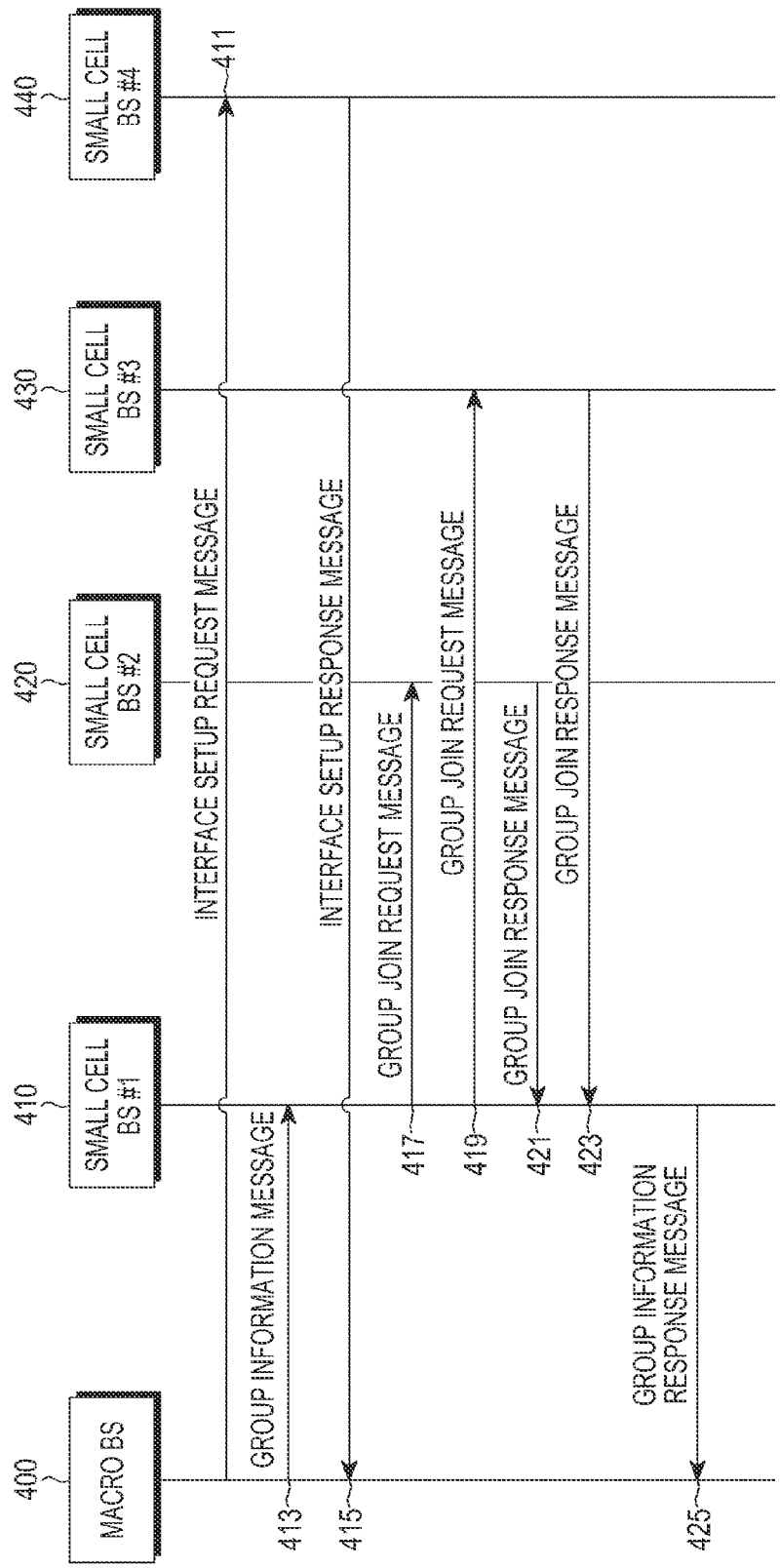
FIG. 4 illustrates establishing an interface between a macro and a small cell BS in operations 215 to 217 in FIG. 2 according to an embodiment of the present disclosure.

FIG. 4 illustrates establishing an interface between a macro and a small cell BS in operations 215 to 217 in FIG. 2 according to an embodiment of the present disclosure.

A process for establishing an interface between a macro BS and a small cell BS in FIG. 4 may be applied to a case that the macro BS establishes an interface with a representative small cell BS and to a case that the macro BS establishes an interface with a member small cell BS.

Referring to FIG. 4, the mobile communication system includes a macro BS 400, a small cell BS #1 410, a small cell BS #2 420, a small cell BS #3 430, and a small cell BS #4 440. It is noted that the small cell BS #1 410, the small cell BS #2 420, and the small cell BS #3 430 are included in the same small cell BS group, the small cell BS #4 440 is not included in any small cell BS group, and a representative small cell BS of the small cell BS group is the small cell BS #1 410.

The macro BS 400 transmits an interface setup request message to the small cell BS #4 440 with which the macro BS 400 should establish an individual interface in operation 411. The macro BS 400 transmits a group information message to the small cell BS #1 410 as a representative small cell BS of the small cell BS group in operation 413. The group information message includes a small cell BS group index of a small cell BS group, a BS IDentifier (ID) of a representative small cell BS of the small cell BS group, and BS IDs of the rest small cell BSs included in the small cell BS group.

After receiving the interface setup request message from the macro BS 400, the small cell BS #4 440 transmits an interface setup response message as a response message to the interface setup request message to the macro BS 400 in operation 415. After the macro BS 400 receives the interface setup response message from the small cell BS #4 440, an individual interface between the macro BS 400 and the small cell BS #4 440 is established. According to the establishment of the individual interface between the macro BS 400 and the small cell BS #4 440, data packet transmission/reception between the macro BS 400 and the small cell BS #4 440 may be possible.

After receiving the group information message, the small cell BS #1 410 transmits a group join request message to the rest small BSs, i.e., the small cell BS #2 420 and the small cell BS #3 430 in operations 417 to 419. After receiving the group join request message, each of the small cell BS #2 420 and the small cell BS #3 430 transmits a group join response message as a response message to the group join request message to the small cell BS #1 410 in operations 421 to 423).

After receiving the group join response message from each of the small cell BS #2 420 and the small cell BS #3 430, the small cell BS #1 410 transmits a group information response message as a response message to the group information message to the macro BS 400 in operation 425. After the macro BS 400 receives the group information response message from the small cell BS #1, a cooperative interface between the macro BS 400 and the small cell BS #1 410 is established. According to the establishment of the cooperative interface between the macro BS 400 and the small cell BS #1 410, data packet transmission/reception between the macro BS 400 and a small cell BS group may be possible. That is, the macro BS 400 may transmit/receive a data packet to/from the small cell BS #2 420 and the small cell BS #3 430 through the small cell BS #1 410 so the macro BS 400 does not establish an individual interface with each of the small cell BS #2 420 and the small cell BS #3 430.

Figure 5:
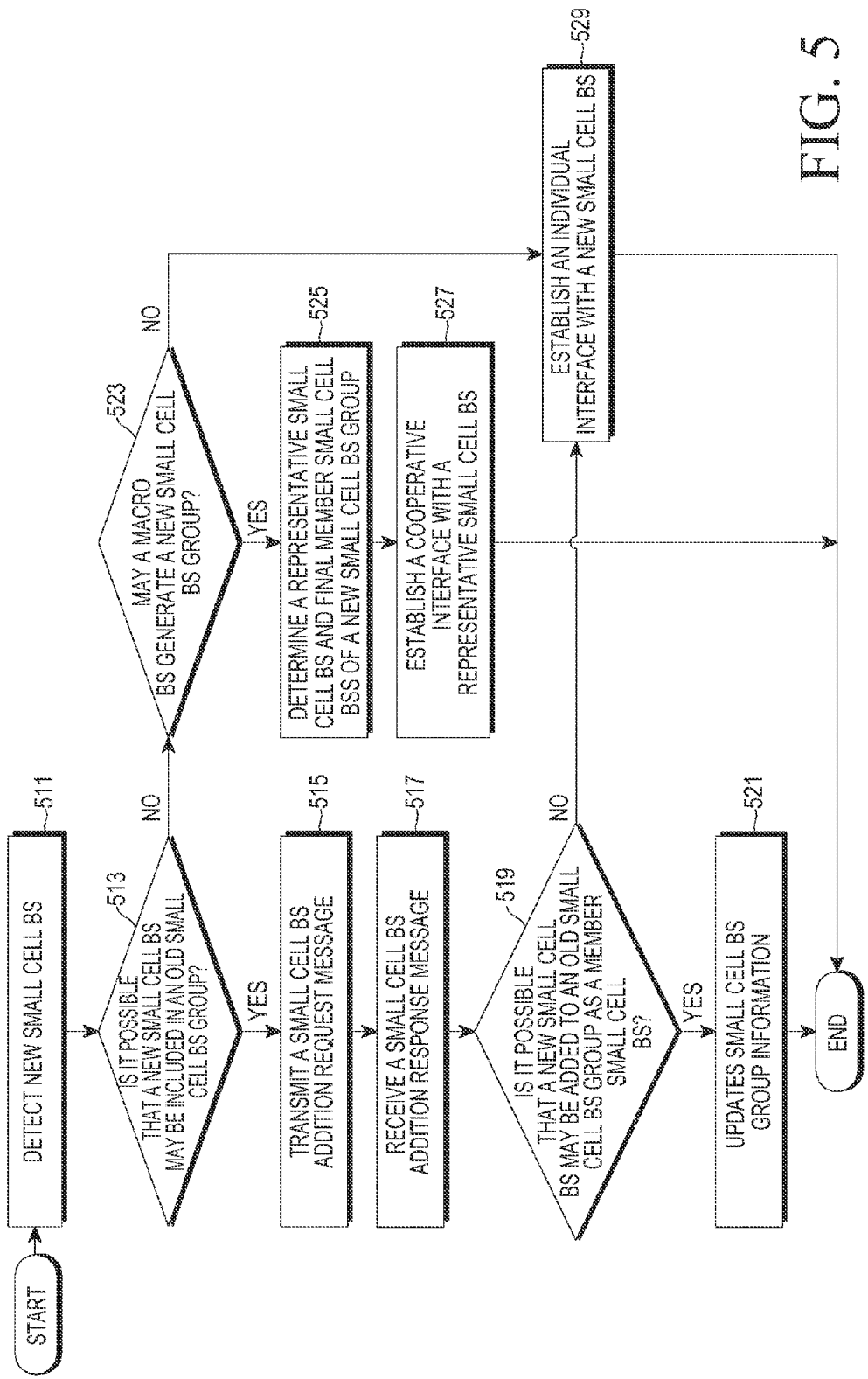
FIG. 5 illustrates a flowchart for setting up an interface with a new small cell BS in a macro BS which has set up interfaces with small cell BSs in a mobile communication system according to an embodiment of the present disclosure.

FIG. 5 illustrates a flowchart for setting up an interface with a new small cell BS in a macro BS which has set up interfaces with small cell BSs in a mobile communication system according to an embodiment of the present disclosure.

Referring to FIG. 5, a macro BS which has set up interfaces with small cell BSs detects a new small cell BS in operation 511. The macro BS determines whether it is possible that the detected new small cell BS may be included in a small cell BS group which the macro BS manages in operation 513. The new small cell BS may be included in the small cell BS group if the new small cell BS is located within a distance less than a threshold inter-small cell distance from a small cell BS group and the number of member small cell BSs included in the small cell BS group is less than a threshold. The threshold denotes the number of small cell BSs included in the one small cell BS group.

If it is possible that the detected new small cell BS may be included in the small cell BS group among the small cell BS groups which the macro BS manages, the macro BS transmits a small cell BS addition request message to a representative small cell BS of the small cell BS in operation 515. The small cell BS addition request message may include a small cell BS group index of a small cell BS group into which the new small cell BS wishes to be added and BS information of the new small cell BS, e.g., a BS ID.

After receiving the small cell BS addition request message from the macro BS, the representative small cell BS determines whether the new small cell BS may be added as a member small cell BS, and generates a small cell BS addition response message based on the determined result.

The macro BS receives the small cell BS addition response message from the representative small cell BS in operation 517. The small cell BS addition response message includes a small cell BS group index of the small cell BS group, a small cell BS addition confirm indicator indicating whether the new small cell BS may be added into the small cell BS group as a member small cell BS, etc.

The macro BS determines whether the new small cell BS may be added into the small cell BS group as a member small cell BS using the small cell BS addition confirm indicator in operation 519. If the new small cell BS may be added into the small cell BS group as the member small cell BS, the macro BS includes the new small cell BS into the small cell BS group as a member small cell BS, and updates information of the arbitrary small cell BS group in operation 521.

Referring back to operation 513, if it is the detected new small cell BS cannot be included in the small cell BS group, the macro BS determines whether the macro BS may generate a new small cell BS group including the small cell BS in operation 523. If the macro BS may generate the new small cell BS group, the macro BS determines a representative small cell BS and member small cell BSs of the new small cell BS group in operation 525. A scheme for determining the representative small cell BS and the final member small BSs of the new small cell BS group is similar to a scheme described in above with reference to FIGS. 2 to 3.

After determining the representative small cell BS and the member small BSs of the new small cell BS group, the macro BS establishes a cooperative interface with the representative small cell BS of the new small cell BS group in operation 527. A scheme for establishing the cooperative interface with the representative small cell BS of the new small cell BS group is similar to a scheme descried in FIGS. 2 to 4, so a detailed description will be omitted.

Referring back to operation 519, if the new small cell BS may not be added into the small cell BS group as the member small cell BS, the macro BS proceeds to operation 529. Further, if the macro BS may not generate the new small cell BS group in operation 523, the macro BS proceeds to operation 529. The macro BS establishes an individual interface with the new small cell BS since the new small cell BS may not be included into the small cell BS group and may not be included into the new small cell BS group by generating the new small cell BS group.

Figure 6:
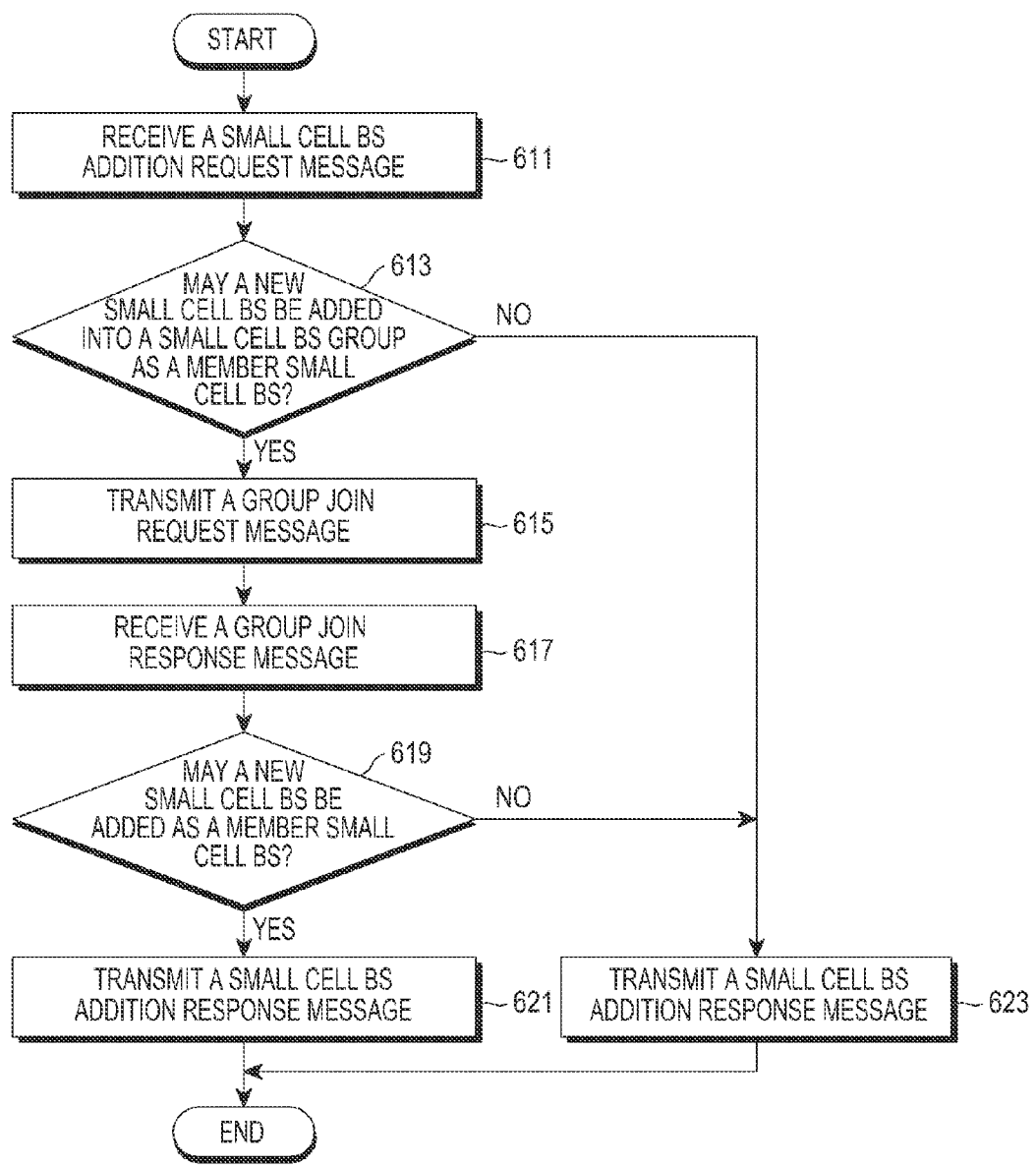
FIG. 6 illustrates a flowchart for determining whether a new small cell BS may be added to a small cell BS group by a representative small cell BS in a mobile communication system according to an embodiment of the present disclosure.

FIG. 6 illustrates a flowchart for determining whether a new small cell BS may be added to a small cell BS group by a representative small cell BS in a mobile communication system according to an embodiment of the present disclosure.

Referring to FIG. 6, the representative small cell BS receives a small cell BS addition request message from a macro BS in operation 611. The small cell BS addition request message may include a small cell BS group index of a small cell BS group into which a new small cell BS wishes to be added, BS information of the new small cell BS, e.g., a BS ID, etc. The representative small cell BS determines whether the new small cell BS may be added into a small cell BS group as a member small cell BS in operation 613. The representative small cell BS determines whether the new small cell BS may be added into the small cell BS group as the member small cell BS based on a capability, the number of member small cell BSs in the small cell BS group, etc.

If the new small cell BS may be added into the small cell BS group as the member small cell BS, the representative small cell BS transmits a group join request message to the new small cell BS in operation 615. The group join request message may include a small cell BS group index of a small cell BS group in which the new small cell BS will be included, a member small cell BS addition available indicator indicating that the new small cell BS may be included in the small cell BS group as a member small cell BS, etc.

The representative small cell BS receives a group join response message as a response message to the group join request message from the new small cell BS in operation 617. The group join response message may include a member small cell BS addition confirm indicator indicating whether the new small cell BS wishes to be added to the small cell BS group as the member small cell BS, etc. The new small cell BS may determine one of operating as a member small cell BS of the small cell BS group, operating by establishing an individual interface with a macro BS, and operating as a member small cell BS of another small cell BS group, and determines a value of the member small cell BS addition confirm indicator based on the determined result. That is, the new small cell BS sets the value of the member small cell BS addition confirm indicator to a preset value, e.g., "1" upon determining to operate as the member small cell BS of the small cell BS group. On the other the new small cell BS sets the value of the member small cell BS addition confirm indicator to a preset value, e.g., "0" upon determining to operate by establishing the individual interface with the macro BS, or to operate as the member small cell BS of another small cell BS group.

The representative small cell BS determines whether the new small cell BS may be added as a member small cell BS based on the member small cell BS addition confirm indicator included in the group join response message in operation 619. If the new small cell BS may be added as the member small cell BS, the representative small cell BS transmits the small cell BS addition response message as a response message to the member small cell BS addition request message to the macro BS in operation 621. The small cell BS addition response message transmitted in operation 621 includes the small cell BS group index of the small cell BS group, a member small cell BS addition confirm indicator indicating whether the new small cell BS may be added to the small cell BS group as a member small cell BS, etc. Here, the member small cell BS addition confirm indicator is set to a value such as "1".

Referring back to operation 613, if the new small cell BS may not be added into the small cell BS group, the representative small cell BS proceeds to operation 623. Referring back to operation 619, if the new small cell BS may not be added as the member small cell BS, the representative small cell BS proceeds to operation 623. The representative small cell BS transmits the small cell BS addition response message as the response message to the small cell BS addition request message to the macro BS in operation 623. The small cell BS addition response message transmitted in operation 623 includes the small cell BS group index of the small cell BS group, the member small cell BS addition confirm indicator indicating whether the new small cell BS may be added to the small cell BS group as the member small cell BS, etc. Here, the member small cell BS addition confirm indicator is set to a value "0" since the new small cell BS may not be added into the small cell BS group in which the representative small cell BS is included as the member small cell BS.

Figure 7:
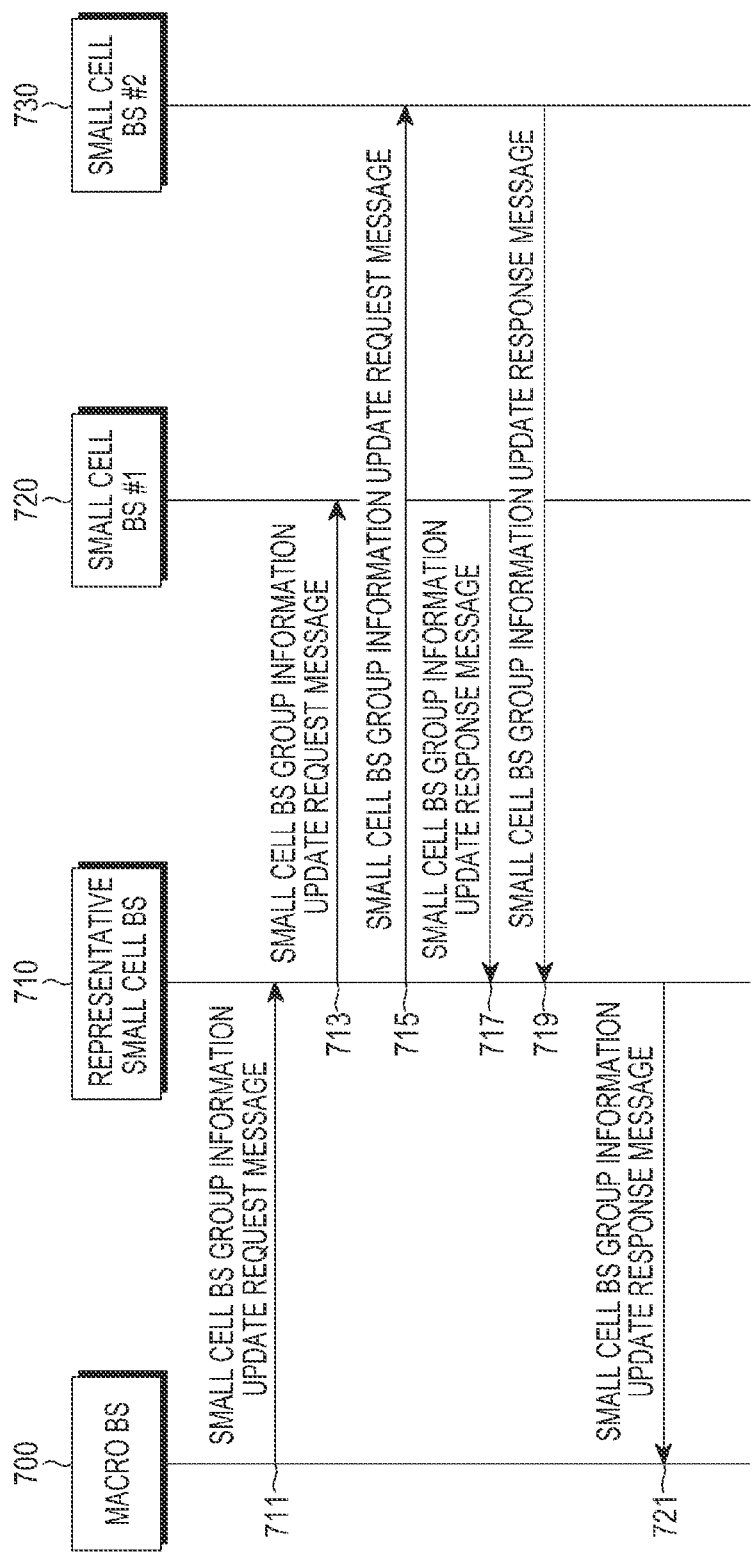
FIG. 7 illustrates updating small cell BS group information between a macro BS and a small cell BS in a mobile communication system according to an embodiment of the present disclosure.

FIG. 7 illustrates updating small cell BS group information between a macro BS and a small cell BS in a mobile communication system according to an embodiment of the present disclosure.

Referring to FIG. 7, the mobile communication system includes a macro BS 700, a representative small cell BS 710, a small cell BS #1 720, and a small cell BS #2 730. The macro BS 700 detects a need for updating small cell BS group information for a small cell BS group among small cell BS groups which the macro BS 700 manages, and transmits a small cell BS group information update request message to a representative small cell BS 710 in operation 711. The small cell BS group information update request message may include a small cell BS group index of a small cell BS group which small cell BS group information wants to update, etc.

After receiving the small cell BS group information update request message, the representative small cell BS 710 transmits a small cell BS group information update request message to each of member small cell BSs included in the small cell BS group (i.e., the small cell BS #1 720 and the small cell BS #2 730) in operations 713 to 715. The small cell BS group information update request message may include information indicating that a related small cell BS should update BS information, update request BS information which the related small cell BS should update, e.g., BS information such as cell load and a cell capability, etc. The BS information such as the cell load and the cell capability may be used for performing a load distribution operation of the macro BS 700.

After receiving the small cell BS group information update request message, each of the small cell BS #1 720 and the small cell BS #2 730 detects BS information based on the update request BS information included in the small cell BS group information update request message, and transmits a small cell BS group information update response message including the detected BS information as a response message to the small cell BS group information update request message to the representative small cell BS 710 in operations 717 to 719.

After receiving the small cell BS group information update response message from each of the small cell BS #1 720 and the small cell BS #2 730, the representative small cell BS 710 detects BS information included in the small cell BS group information update response message and transmits a small cell BS group information update response message including the detected BS information as a response message to the small cell BS group information update request message to the macro BS 700 in operation 721. After the macro BS 700 receives the small cell BS group information update response message from the representative small cell BS 710, small cell BS group information becomes updated between the macro BS 700 and the small cell BS group.

Referring to FIG. 7, according to a need of a macro BS, the macro BS updates BS group information between a macro BS and a small cell BS group by transmitting a small cell BS group information update request message to a representative small cell BS. However, it will be understood by those of ordinary skill in the art that the BS group information between the macro BS and the small cell BS group may be updated according to a need of the representative small cell BS, or the BS group information between the macro BS and the small cell BS group may be updated by a preset period without a request of the macro BS or the representative small cell BS.

Figure 8:
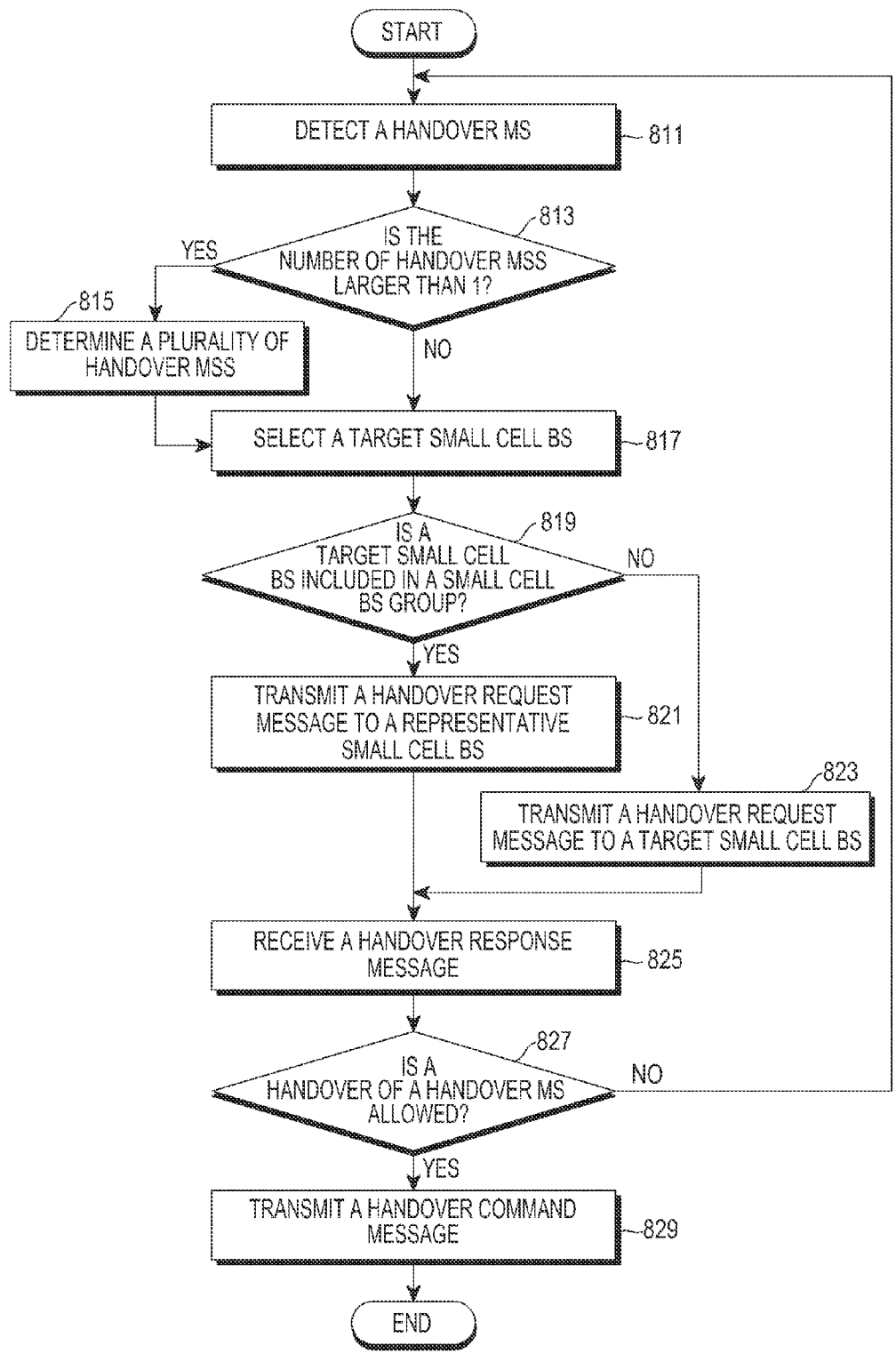
FIG. 8 illustrates a flowchart for controlling handover operations of Mobile Stations (MSs) in a macro BS in a mobile communication system according to an embodiment of the present disclosure.

FIG. 8 illustrates a flowchart for controlling handover operations of MSs in a macro BS in a mobile communication system according to an embodiment of the present disclosure.

Referring to FIG. 8, the macro BS detects that there is a handover MS which will perform a handover operation in operation 811. The handover MS may be determined according to one of a case that a location of a related MS changes, a case that channel status of the MS becomes bad without changing the location of the related MS, and a case that a small cell BS which is connected to one of the macro BS and the related MS should distribute load of one of a representative small cell BS and the small cell BS even though the location of the related MS does not change and the channel status of the MS is good. That is, an MS may perform a handover operation in order to distribute load of one of a macro BS, a representative small cell BS, and a small cell BS regardless of location movement and channel status. Here, a criterion for distributing the load of one of the macro BS, the representative small cell BS, and the small cell BS may be implemented as various forms, and a detailed description of the criterion will be omitted. In FIG. 8, in this example, the macro BS detects the handover MS in order to distribute the load of one of the macro BS, the representative small cell BS, and the small cell BS regardless of the location movement and the channel status.

The macro BS determines whether the number of the detected handover MSs is larger than 1 in operation 813. If the MS uses less traffic than preset threshold traffic quantity or the MS which will perform a general handover, the macro BS detects only the MS as a handover MS, so the number of the handover MSs is 1. On the other hand, if total load of a macro cell which the macro BS manages is higher than the threshold traffic quantity, the macro BS detects a plurality of handover MSs.

If the number of the detected handover MSs is larger than 1, the macro BS determines a plurality of handover MSs to distribute the load of the macro BS in operation 815. If the number of the detected handover MSs is not larger than 1, the macro BS selects a target small cell BS to which a related handover MS will handover in operation 817. The process for selecting the target small cell BS will be described below.

The macro BS determines whether the target small cell BS is included in a small cell BS group in operation 819. If the target small cell BS is included in the small cell BS group, the macro BS transmits a handover request message to a representative small cell BS of the small cell BS group in which the target small cell BS is included in operation 821. The handover request message transmitted in operation 821 may include an MS ID of the MS, BS information of a serving small cell BS which is currently connected to the MS, BS information of the target small cell BS for the MS, a candidate target small cell BS list including BS IDs of candidate target small cell BSs which are preferred for the MS to perform a handover operation, etc. The process for determining the target BS list will be described below.

If the target small cell BS is not included in the small cell BS group, the macro BS transmits a handover request message to the target small cell BS in operation 823.

The handover request message transmitted in operation 823 may include the MS ID of the handover MS, the BS information of the serving small cell BS, the BS information of the target small cell BS for the handover MS, etc.

The macro BS receives a handover response message as a response message to the handover request message from one of a representative small cell BS and the target small cell BS in operation 825. The handover response message may be implemented with different formats, and a description will be provided below.

First, a handover response message as a response message to the handover request message transmitted in operation 821 may include information indicating whether the handover of the handover MS is allowed and target small cell BS information.

On the other hand, a handover response message as a response message to the handover request message transmitted in operation 823 may include information indicating whether the target small cell BS allows the handover of the handover MS, etc.

The macro BS determines if the handover of the handover MS is allowed using the information indicating whether the handover of the handover MS is allowed in operation 827. If the handover of the handover MS is not allowed, the macro BS returns to operation 811.

If the handover of the handover MS is allowed, the macro BS transmits a handover command message which commands the handover MS to perform a handover operation to the target small cell BS in operation 829.

Figure 9:
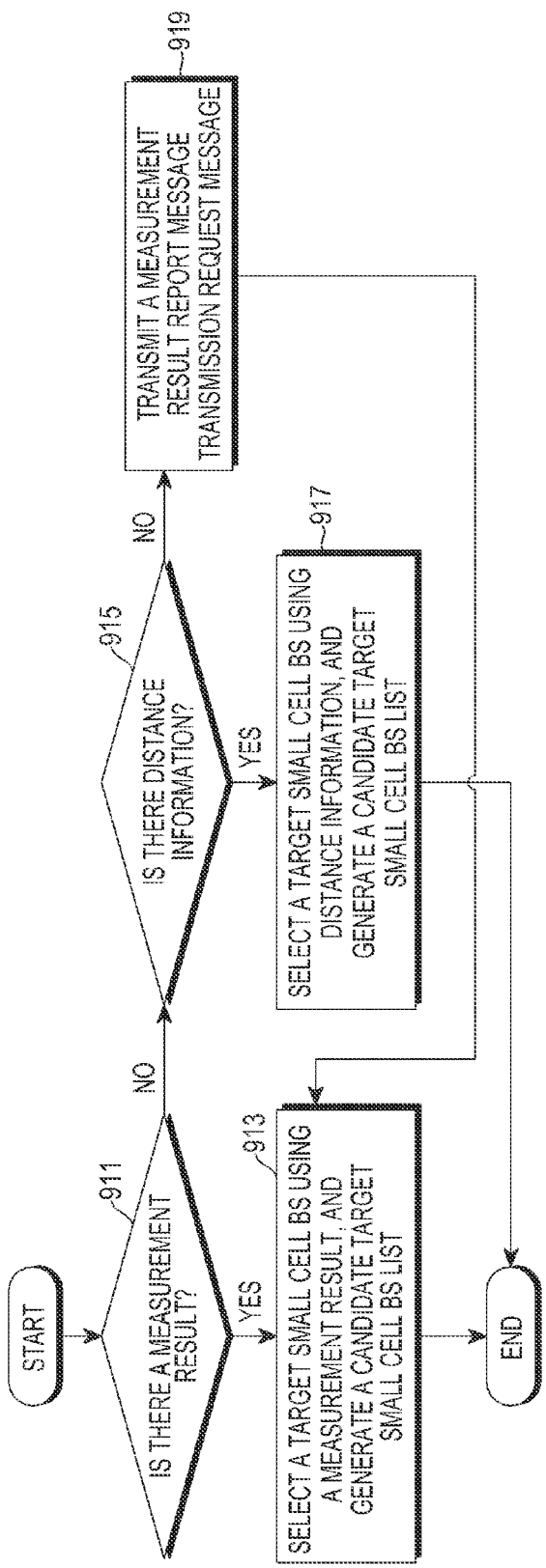
FIG. 9 illustrates a flowchart for determining a target small cell BS for a handover MS in a macro BS in a mobile communication system according to an embodiment of the present disclosure.

FIG. 9 schematically a flowchart for determining a target small cell BS for a handover MS in a macro BS in a mobile communication system according to an embodiment of the present disclosure.

Referring to FIG. 9, the macro BS determines if there is a measurement result for a channel between the handover MS and a small cell BS in operation 911. If there is the measurement result, the macro BS selects a target small cell BS using the measurement result for the channel between the handover MS and the small cell BS and generates a candidate target small cell BS list in operation 913. For example, the macro BS may determine a small cell BS which transmits a reference signal with maximum received signal strength as the target small cell BS, and determine a preset number of small cell BSs starting from a small cell BS which transmits a reference signal with the next strong received signal strength as small cell BSs included in the candidate target small cell BS list. Here, received signal strength may be one of an SINR, an SNR, a RSSI, a CQI, etc. The macro BS may store the candidate target small cell BS list until a there is a successful handover operation of the handover MS.

Referring back to operation 911, if there is no measurement result for the channel between the handover MS and the small cell BS, the macro BS determines whether there is distance information between the handover MS and each of small cell BSs in operation 915. If there is the distance information between the handover MS and each of the small cell BSs, the macro BS selects a target small cell BS for the handover MS using the distance information between the handover MS and each of the small cell BSs, and generates a candidate target small cell BS list in operation 917. For example, the macro BS may determine a small cell BS which is nearest from the handover MS as the target small cell BS, and determine a preset number of small cell BSs starting from a small cell BS with the next near distance from the handover MS as small cell BSs included in the candidate target small cell BS list. The macro BS may store the candidate target small cell BS list until there is a successful handover operation of the handover MS.

Referring back to operation 915, if there is no distance information between the handover MS and each of the small cell BSs, the macro BS transmits a measurement result report message transmission request message to the handover MS which requests transmission of a measurement result report message in operation 919. The measurement result report message transmission request message may include information necessary for induce transmitting of the measurement result report message such as a period for transmitting the measurement result report message in order for the handover MS to transmit the measurement result report message.

Figure 10:
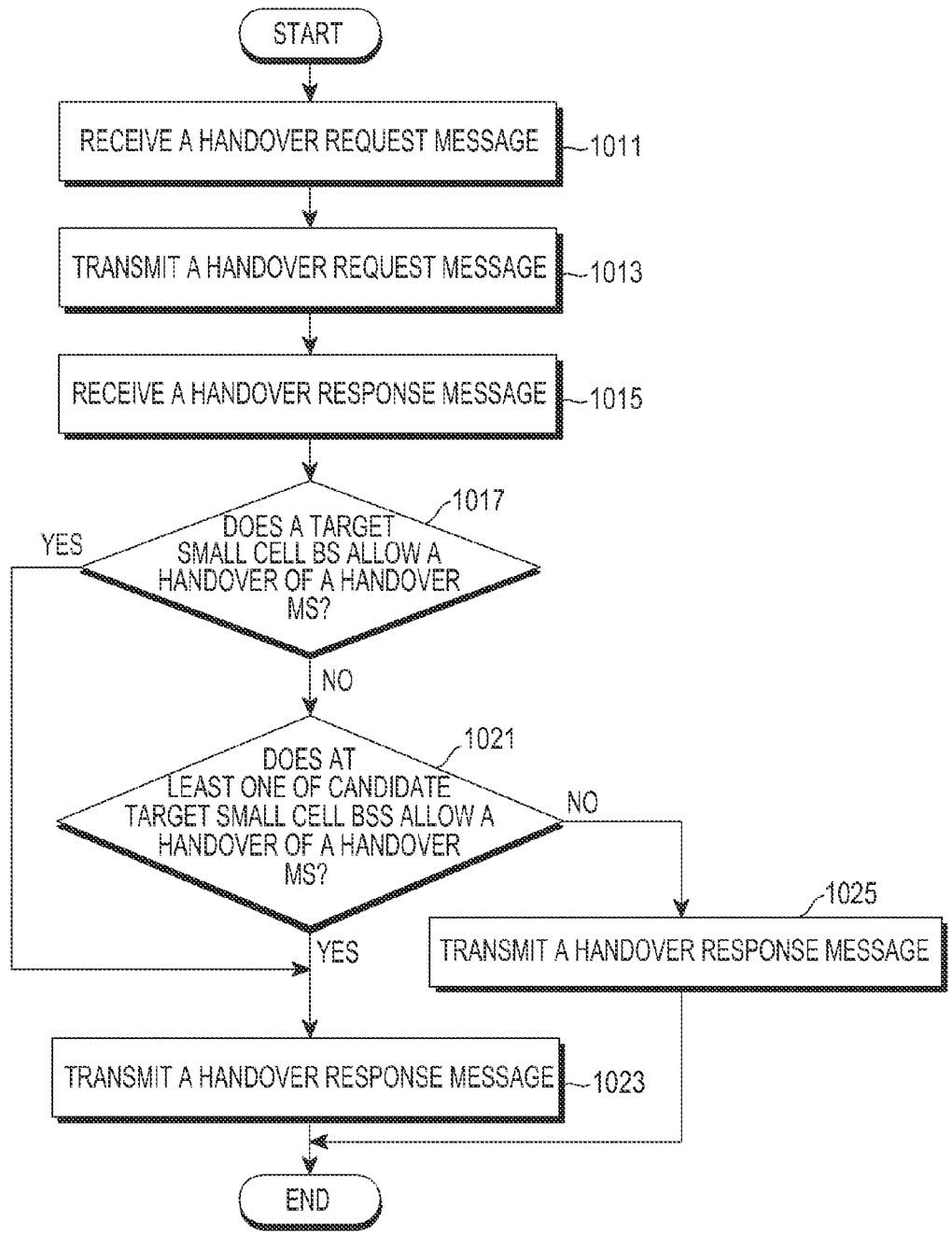
FIG. 10 illustrates a flowchart for performing a handover with a representative small cell BS in a mobile communication system according to an embodiment of the present disclosure.

FIG. 10 illustrates a flowchart for performing a handover with a representative small cell BS in a mobile communication system according to an embodiment of the present disclosure.

Referring to FIG. 10, the representative small cell BS receives a handover request message from a macro BS in operation 1011. The handover request message may include an MS ID of the handover MS, BS information of a serving small cell BS which is currently connected to the handover MS, BS information of a target small cell BS for the handover MS, a candidate target small cell BS list including BS IDs of candidate target small cell BSs which are preferred for the handover MS to perform a handover operation among small cell BSs included in the small cell BS group, etc.

The representative small cell BS transmits a handover request message to BSs corresponding to the target small cell BS information and the candidate target small cell BS list included in the handover request message, i.e., the target small cell BS and the candidate target small cell BSs in operation 1013. The representative small cell BS receives a handover response message as a response message to the handover request message from each of the target small cell BS and the candidate target small cell BSs in operation 1015.

The representative small cell BS determines whether the target small cell BS allows a handover of the handover MS based on the handover response message received from the target small cell BS in operation 1017. If the target small cell BS allows a handover of the handover MS, the representative small cell BS transmits a handover response message including information indicating that a handover of a related MS is allowed and information indicating the target BS to the macro BS in operation 1023.

If the target small cell BS does not allow a handover of the handover MS, the representative small cell BS determines whether at least one of the candidate target small cell BSs corresponding the candidate target small cell BS list allows the handover of the handover MS in operation 1021. If the at least one of the candidate target small cell BSs corresponding the candidate target small cell BS list allows the handover of the handover MS, the representative small cell BS proceeds to operation 1023. In this case, if a plurality of candidate target small cell BSs allow the handover of the handover MS, the representative small cell BS determines a candidate target small cell BS with the highest priority according to an order of the candidate target small cell BS list as the final target BS. The representative small cell BS determines a specific target small cell BS among the candidate target small cell BSs as a new target small cell BS, and transmits a handover notification response message including information indicating that a handover of a related MS is allowed and information indicating the target BS to the macro BS in operation 1023.

Referring back to operation 1021, if all of the candidate target small cell BSs do not allow the handover of the handover MS, the representative small cell BS transmits a message indicating that the handover request of the handover MS does not allow handover to the macro BS in operation 1025.

Figure 11:
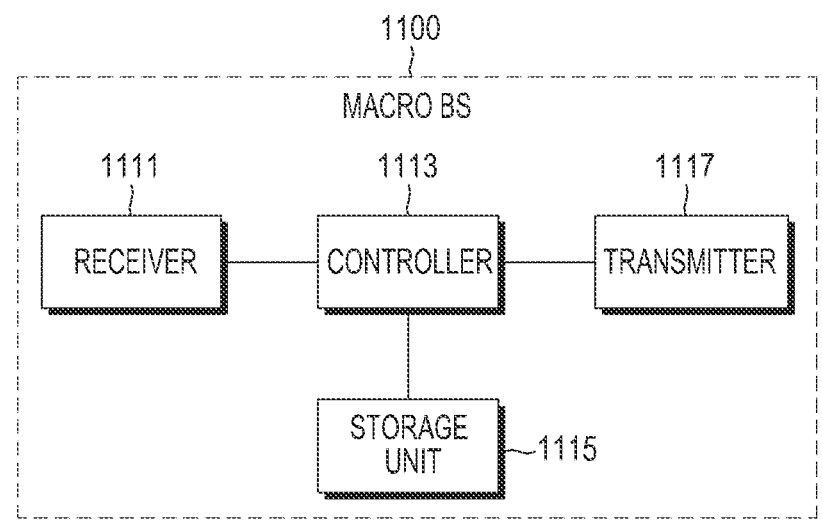
FIG. 11 illustrates a block diagram of a macro BS in a mobile communication system according to an embodiment of the present disclosure.

FIG. 11 illustrates block diagram of a macro BS in a mobile communication system according to an embodiment of the present disclosure.

Referring to FIG. 11, a macro BS 1100 includes a receiver 1111, a controller 1113, a storage unit 1115, and a transmitter 1117.

The controller 1113 controls the overall operation of the macro BS 1100. In particular, the controller 1113 controls the macro BS 1100 to provide a cooperative communication service using a cooperative interface or an individual interface with one or more small cell BSs. The operation related to providing the cooperative communication service using the cooperative interface or the individual interface with the small cell BSs is performed in the manner as described above before with reference to FIGS. 2 to 10.

The receiver 1111 receives messages from small cell BSs, MSs, etc. under a control of the controller 1113.

The storage unit 1115 stores the messages received in the receiver 1111, and a program and data related to the operation of the macro BS 1100.

The transmitter 1117 transmits messages to small cell BSs, MSs, etc. under a control of the controller 1113.

While the receiver 1111, the controller 1113, the storage unit 1115, and the transmitter 1117 are shown in FIG. 11 as separate units, it is to be understood that this is for merely convenience of description. In other words, two or more of the receiver 1111, the controller 1113, the storage unit 1115, and the transmitter 1117 may be incorporated into a single unit.

Figure 12:
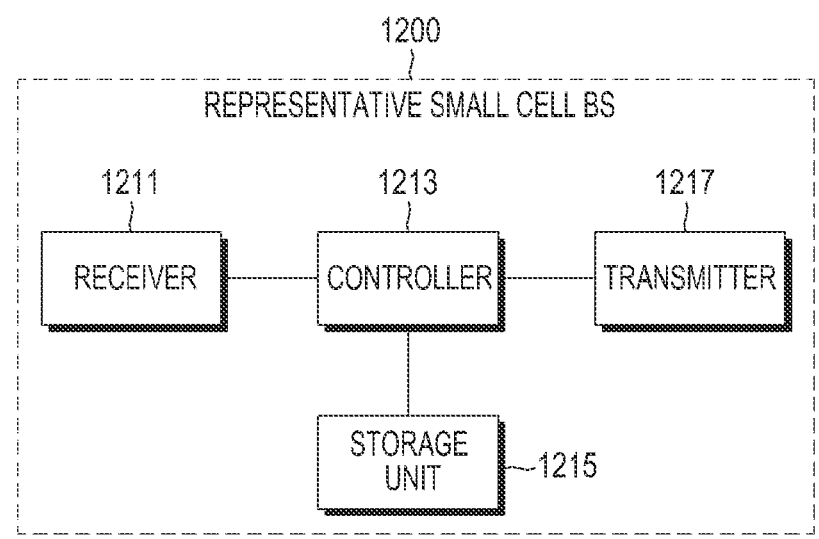
FIG. 12 illustrates a block diagram of a representative small cell BS in a mobile communication system according to an embodiment of the present disclosure.

FIG. 12 illustrates a block diagram of a representative small cell BS in a mobile communication system according to an embodiment of the present disclosure.

Referring to FIG. 12, a representative small cell BS 1200 includes a receiver 1211, a controller 1213, a storage unit 1215, and a transmitter 1217.

The controller 1213 controls the overall operation of the representative small cell BS 1200. In particular, the controller 1213 controls the representative small cell BS 1200 to provide a cooperative communication service using a cooperative interface or an individual interface with a macro BS. The operation related to providing the cooperative communication service using the cooperative interface or the individual interface with the macro BS is performed in the manner as described above with reference to FIGS. 2 to 10.

The receiver 1211 receives messages from a macro BS, small cell BSs, MSs, etc. under a control of the controller 1213.

The storage unit 1215 stores the messages received by the receiver 1211, and a program and data related to the operation of the representative small cell BS 1200.

The transmitter 1217 transmits messages to a macro BS, small cell BSs, MSs, etc. under a control of the controller 1213.

While the receiver 1211, the controller 1213, the storage unit 1215, and the transmitter 1217 are shown in FIG. 12 as separate units, it is to be understood that this is for merely convenience of description. In other words, two or more of the receiver 1211, the controller 1213, the storage unit 1215, and the transmitter 1217 may be incorporated into a single unit.

Figure 13:
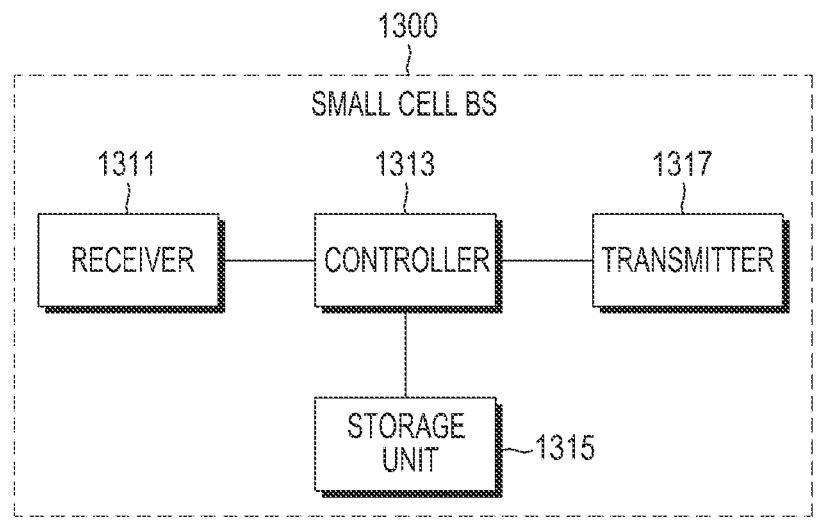
FIG. 13 illustrates a block diagram of a small cell BS in a mobile communication system according to an embodiment of the present disclosure.

FIG. 13 illustrates a block diagram of a small cell BS in a mobile communication system according to an embodiment of the present disclosure.

Referring to FIG. 13, a small cell BS 1300 includes a receiver 1311, a controller 1313, a storage unit 1315, and a transmitter 1317.

The controller 1313 controls the overall operation of the small cell BS 1300. In particular, the controller 1313 controls the small cell BS 1300 to provide a cooperative communication service using a cooperative interface or an individual interface with a macro BS. The operation related to providing the cooperative communication service using the cooperative interface or the individual interface with the macro BS is performed in the manner as described above with reference to FIGS. 2 to 10.

The receiver 1311 receives messages from a macro BS, a representative small cell BS, other small cell BSs, MSs, etc. under a control of the controller 1313.

The storage unit 1315 stores the messages received in the receiver 1311, and a program and data related to the operation of the small cell BS 1300.

The transmitter 1317 transmits messages to a macro BS, a representative small cell BS, other small cell BSs, MSs, etc. under a control of the controller 1313.

While the receiver 1311, the controller 1313, the storage unit 1315, and the transmitter 1317 are shown in FIG. 13 as separate units, it is to be understood that this is for merely convenience of description. In other words, two or more of the receiver 1311, the controller 1313, the storage unit 1315, and the transmitter 1317 may be incorporated into a single unit.

Figure 14:
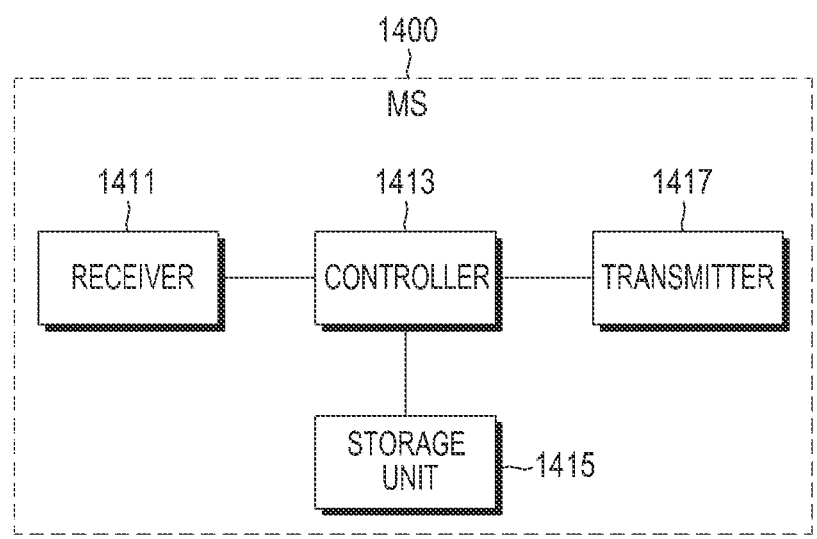
FIG. 14 illustrates a block diagram of an MS in a mobile communication system according to an embodiment of the present disclosure.

FIG. 14 illustrates a block diagram of an MS in a mobile communication system according to an embodiment of the present disclosure.

Referring to FIG. 14, an MS 1400 includes a receiver 1411, a controller 1413, a storage unit 1415, and a transmitter 1417.

The controller 1413 controls the overall operation of the MS 1400. In particular, the controller 1413 controls the MS 1400 to receive a cooperative communication service using a cooperative interface or an individual interface from a macro BS and receive a communication service from a macro BS, a representative small cell BS and small cell BSs. The operation related to receiving a cooperative communication service using a cooperative interface or an individual interface from a macro BS and receiving a communication service from a macro BS, a representative small cell BS and small cell BSs is performed in the manner described above with reference to FIGS. 2 to 10.

The receiver 1411 receives messages from a macro BS, a representative small cell BS, other small cell BSs, etc. under a control of the controller 1413.

The storage unit 1415 stores the messages received in the receiver 1411, and a program and data related to the operation of the MS 1400.

The transmitter 1417 transmits messages to a macro BS, a representative small cell BS, other small cell BSs, etc. under a control of the controller 1413.

While the receiver 1411, the controller 1413, the storage unit 1415, and the transmitter 1417 are shown in FIG. 14 as separate units, it is to be understood that this is for merely convenience of description. In other words, two or more of the receiver 1411, the controller 1413, the storage unit 1415, and the transmitter 1417 may be incorporated into a single unit.

As is apparent from the foregoing description, the present disclosure enables to provide a cooperative communication system service between a macro BS and a small cell BS in a mobile communication system.

The present disclosure enables a cooperative communication system service between a macro BS and a small cell BS if a small cell BS is located within a service coverage of a macro BS in a mobile communication system.

The present disclosure enables a cooperative communication system service between a macro BS and a small cell BS in a mobile communication system to effectively distribute data traffic of a macro BS.

The present disclosure enables a cooperative communication system service between a macro BS and a small cell BS in a mobile communication system to guarantee mobility of an MS.

The present disclosure enables a cooperative communication system service between a macro BS and a small cell BS in a mobile communication system to increase radio resource efficiency.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a cooperative communication service by a serving base station (BS) in a mobile communication system, the method comprising:
    establishing a cooperative interface with a first BS among BSs included in at least one BS group; and
    providing a cooperative communication service with the at least one BS group using the cooperative interface,
    wherein the at least one BS group is generated by grouping the BSs if a number of the BSs is greater than or equal to a threshold value, and the BSs are within a service coverage of the serving BS, and
    wherein the threshold value is determined by considering a system performance to be acquired if a communication service between the serving BS and a BS among the BSs is the cooperative communication service and a system performance to be acquired if the communication service between the serving BS and the BS is not the cooperative communication service.

2. The method of claim 1, wherein, for each of the BSs, if a distance between a BS and another BS is less than a threshold distance and the BS is capable of communicating with the other BS, the BS and the other BS are generated as a BS group.

3. The method of claim 1, wherein the establishing of the cooperative interface with the first BS among the BSs included in the at least one BS group comprises:
    transmitting a group information message including a BS group index of a BS group in which the first BS is included, a BS identifier (ID) of the first BS, and BS IDs of remaining BSs included in the BS group to the first BS; and
    receiving a group information response message as a response message to the group information message from the first BS.

4. The method of claim 1, further comprising:
    detecting that there is a mobile station (MS) which intends to perform a handover operation during providing the cooperative communication service with the at least one BS group;
    determining a target BS to which the MS intends to handover;
    if the target BS is included in a BS group among the at least one BS group, transmitting a handover notification message notifying that the MS intends to handover to a first BS included in the BS group;
    receiving a handover notification response message as a response message to the handover notification message which allows the handover of the MS from the first BS included in the BS group; and
    transmitting a handover command message which commands the MS to handover to the target BS to the MS.

5. The method of claim 1, further comprising:
    detecting that there is a mobile station (MS) which intends to perform a handover operation during providing the cooperative communication service with the at least one BS group;
    determining a target BS to which the MS intends to handover;
    if the target BS is not included in a BS group among the at least one BS group, transmitting a handover notification message notifying that the MS intends to handover to the target BS;
    receiving a handover notification response message as a response message to the handover notification message which allows the handover of the MS from the target BS; and
    transmitting a handover command message which commands the MS to handover to the target BS to the MS.

6. A method for providing a cooperative communication service by a first base station (BS) in a mobile communication system, the method comprising:
    establishing a cooperative interface with a serving BS; and
    providing a cooperative communication service with the serving BS using the cooperative interface,
    wherein the first BS is included in a BS group including BSs,
    wherein the BS group is generated by grouping the BSs if a number of the BSs is greater than or equal to a threshold value, and the BSs are within a service coverage of the serving BS, and
    wherein the threshold value is determined by considering a system performance to be acquired if a communication service between the serving BS and a BS among the BSs is the cooperative communication service and a system performance to be acquired if the communication service between the serving BS and the BS is not the cooperative communication service.

7. The method of claim 6, wherein, for each of the BSs, if a distance between a BS and another BS is less than a threshold distance and the BS is capable of communicating with the other BS, the BS and the other BS are generated as a BS group.

8. The method of claim 6, wherein the establishing the cooperative interface with the serving BS comprises:
    receiving a group information message including a BS group index of a BS group in which the first BS is included, a BS identifier (ID) of the first BS, and BS IDs of remaining BSs included in the BS group from the serving BS;
    transmitting a group join request message to each of the remaining BSs;
    receiving a group join response message as a response message to the group join request message from each of the remaining BSs; and
    transmitting a group information response message as a response message to the group information message to the serving BS.

9. The method of claim 6, further comprising:
    receiving a first handover notification message notifying that a mobile station (MS) intends to handover to a target BS as one of the BSs from the serving BS;
    transmitting a second handover notification message notifying that the MS intends to handover to the target BS;
    receiving a first handover notification response message indicating that the target BS allows the handover of the MS as a response message to the second handover notification message from the target BS; and
    transmitting a second handover notification response message indicating that the target BS allows the handover of the MS as a response message to the first handover notification message to the serving BS.

10. A serving base station (BS) in a mobile communication system, the serving BS comprising:
a controller configured to:
establish a cooperative interface with a first BS among BSs included in at least one BS group, and
provide a cooperative communication service with the at least one BS group using the cooperative interface,
wherein the at least one BS group is generated by grouping the BSs if a number of the BSs is greater than or equal to a threshold value, and the BSs are within a service coverage of the serving BS, and
wherein the threshold value is determined by considering a system performance to be acquired if a communication service between the serving BS and a BS among the BSs is the cooperative communication service and a system performance to be acquired if the communication service between the serving BS and the BS is not the cooperative communication service.

11. The serving BS of claim 10, wherein, for each of the BSs, if a distance between a BS and another BS is less than a threshold distance and the BS is capable of communicating with the other BS, the BS and the other BS are generated as a BS group.

12. The serving BS of claim 10, further comprising:
a transceiver configured to transmit a group information message including a BS group index of a BS group in which the first BS is included, a BS identifier (ID) of the first BS, and BS IDs of the remaining BSs included in the BS group to the first BS; and
a receiver configure to receive a group information response message as a response message to the group information message from the first BS.

13. The serving BS of claim 10, further comprising:
a transceiver,
wherein the controller is further configured to:
detect that there is a mobile station (MS) which intends to perform a handover operation during providing the cooperative communication service with the at least one BS group, and
determine a target BS to which the MS intends to handover,
wherein, if the target BS is included in a BS group among the at least one BS group, the transceiver transmits a handover notification message notifying that the MS intends to handover to a first BS included in the BS group,
wherein the transceiver receives a handover notification response message as a response message to the handover notification message which allows the handover of the MS from the first BS included in the BS group, and
wherein the transceiver transmits a handover command message which commands the MS to handover to the target BS to the MS.

14. The serving BS of claim 10, further comprising:
a transceiver,
wherein the controller is further configured to:
detect that there is a mobile station (MS) which intends to perform a handover operation during providing the cooperative communication service with the at least one BS group, and
determine a target BS to which the MS intends to handover,
wherein, if the target BS is not included in a BS group among the at least one BS group, the transceiver transmits a handover notification message notifying that the MS intends to handover to the target BS,
wherein the transceiver receives a handover notification response message as a response message to the handover notification message which allows the handover of the MS from the target BS, and
wherein the transceiver transmits a handover command message which commands the MS to handover to the target BS to the MS.

15. A first base station (BS) in a mobile communication system, the first BS comprising:
a controller configured to:
establish a cooperative interface with a serving BS, and
provide a cooperative communication service with the serving BS using the cooperative interface,
wherein the first BS is included in a BS group including BSs,
wherein the BS group is generated by grouping the BSs if a number of the BSs is greater than or equal to a threshold value, and the BSs are within a service coverage of the serving BS, and
wherein the threshold value is determined by considering a system performance to be acquired if a communication service between the serving BS and a BS among the BSs is the cooperative communication service and a system performance to be acquired if the communication service between the serving BS and the BS is not the cooperative communication service.

16. The first BS of claim 15, wherein, for each of the BSs, if a distance between a BS and another BS is less than a threshold distance and the BS is capable of communicating with the other BS, the BS and the other BS are generated as a BS group.

17. The first BS of claim 15, further comprising:
a transceiver configured to:
receive a group information message including a BS group index of a BS group in which the first BS is included, a BS identifier (ID) of the first BS, and BS IDs of remaining BSs included in the BS group from the serving BS,
transmit a group join request message to each of the remaining BSs,
receive a group join response message as a response message to the group join request message from each of the remaining BSs, and
transmit a group information response message as a response message to the group information message to the serving BS.

18. The first BS of claim 15, further comprising:
a transceiver,
wherein the transceiver receives a first handover notification message notifying that a mobile station (MS) intends to handover to a target BS as one of the BSs from the serving BS,
wherein the transceiver transmits a second handover notification message notifying that the MS intends to handover to the target BS,
wherein the transceiver receives a first handover notification response message indicating that the target BS allows the handover of the MS as a response message to the second handover notification message from the target BS, and
wherein the transceiver transmits a second handover notification response message indicating that the target BS allows the handover of the MS as a response message to the first handover notification message to the serving BS.

19. A method for providing a cooperative communication service by a second base station (BS) in a mobile communication system, the method comprising:
- receiving a group join request message from a first BS included in a BS group including BSs; and
- transmitting a group join response message as a response message to the group join request message to the first BS,
- wherein the group join request message is transmitted if the first BS receives a group information message from a serving BS,
- wherein the BS group is generated by grouping the BSs if a number of the BSs is greater than or equal to a threshold value, and the BSs are within a service coverage of the serving BS, and
- wherein the threshold value is determined by considering a system performance to be acquired if a communication service between the serving BS and a BS among the BSs is the cooperative communication service and a system performance to be acquired if the communication service between the serving BS and the BS is not the cooperative communication service.

20. The method of claim 19, wherein the group information message includes a BS group index of the BS group, a BS identifier (ID) of the first BS, and BS IDs of remaining BSs included in the BS group.

21. A second Base Station (BS) in a mobile communication system, the second BS comprising:
- a transceiver configured to:
  - receive a group join request message from a first BS included in a BS group including BSs, and
  - transmit a group join response message as a response message to the group join request message to the first BS,
- wherein the group join request message is transmitted if the first BS receives a group information message from a serving BS,
- wherein the BS group is generated by grouping the BSs if a number of the BSs is greater than or equal to a threshold value, and the BSs are within a service coverage of the serving BS, and
- wherein the threshold value is determined by considering a system performance to be acquired if a communication service between the serving BS and a BS among the BSs is the cooperative communication service and a system performance to be acquired if the communication service between the serving BS and the BS is not the cooperative communication service.

22. The second BS of claim 21, wherein the group information message includes a BS group index of the BS group, a BS identifier (ID) of the first BS, and BS IDs of remaining BSs included in the BS group.

* * * * *